(No Model.)
H. B. COX.
GALVANIC BATTERY.
No. 383,706. Patented May 29, 1888.
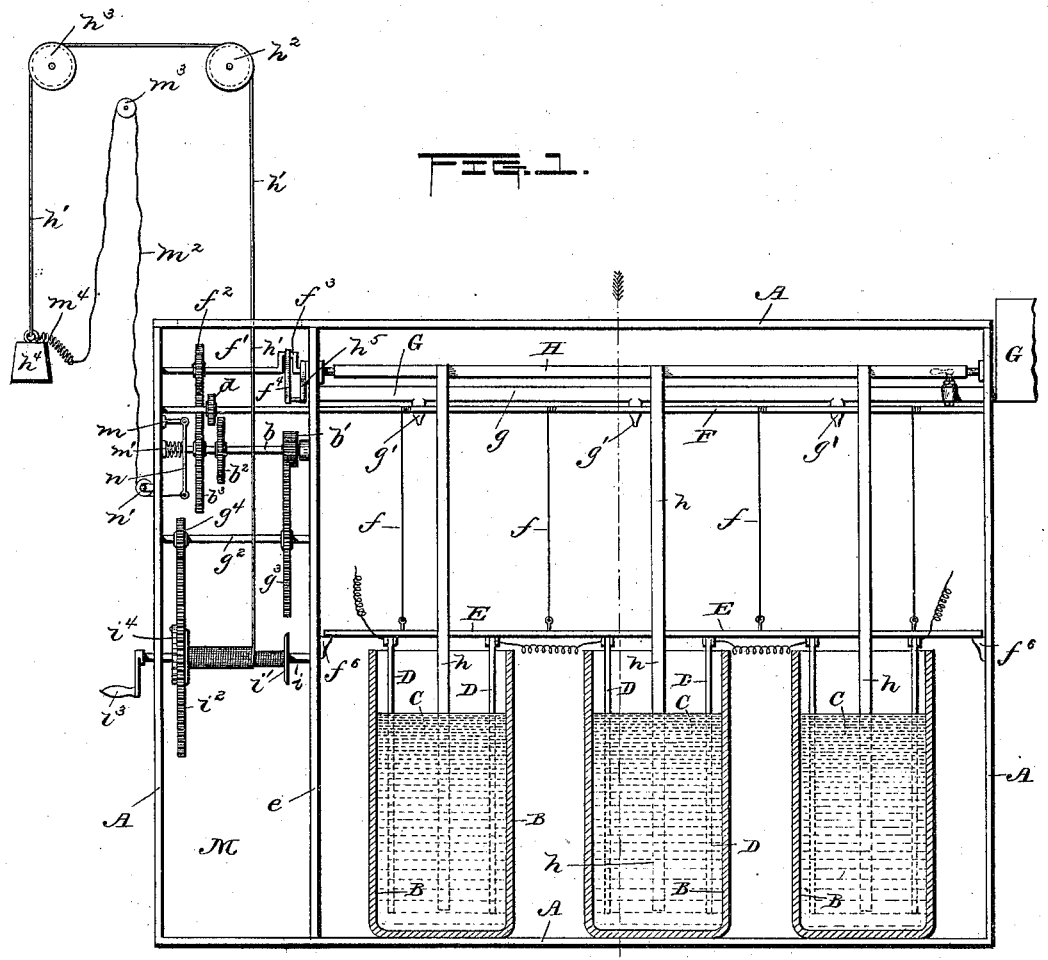
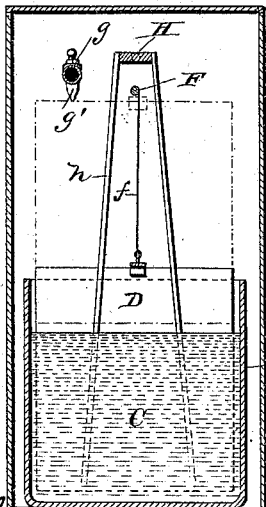
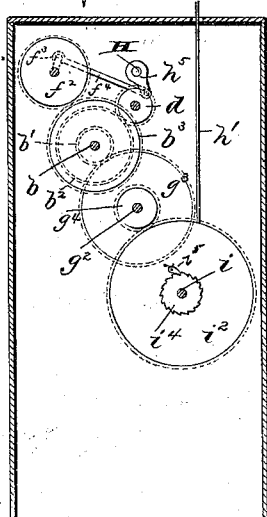
Witnesses.
Inventor.
Harry B. Cox.
Attorney.

UNITED STATES PATENT OFFICE.

HARRY BARRINGER COX, OF CINCINNATI, OHIO, ASSIGNOR TO GEORGE CLARKE COX, OF SAME PLACE.

GALVANIC BATTERY.

SPECIFICATION forming part of Letters Patent No. 383,706, dated May 29, 1888.

Application filed December 17, 1887. Serial No. 258,203. (No model.)

*To all whom it may concern:*

Be it known that I, HARRY BARRINGER COX, of Cincinnati, in the county of Hamilton and State of Ohio, have invented certain new and useful Improvements in Galvanic Generators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in galvanic generators.

The object of my invention is to provide improved mechanical means whereby the electrolyte or solution in the cells is kept in a constant state of agitation, thus preventing polarization of the plates or electrodes.

A further object is to provide automatic means whereby the plates or electrodes can be removed from the electrolyte or solution and the generation of electricity be stopped.

With these ends in view my invention consists in certain novel features of construction and combinations of parts, more fully described hereinafter, and particularly pointed out in the claims.

In the accompanying drawings, Figure 1 is a partial longitudinal vertical section of my complete device. Fig. 2 is a vertical cross-section through one of the cells and stirrers; and Fig. 3 is an end elevation, with the outer wall removed to show the shafts and gearing.

In the drawings, the reference-letter A represents a suitable supporting-frame, in which are placed one or more cells, B, containing any suitable electrolyte, C.

The positive and negative plates or electrodes D are secured at their upper ends to a vertically-movable supporting frame or bar, E, which extends horizontally across the open ends of the cells.

A winding-shaft, F, is horizontally journaled in the upper part of the main frame, above and parallel with the electrode-supporting bar or frame E, and is connected to the same by means of wires, cords, or the like, the cords or connections being secured at their lower ends to the electrode-carrying frame, and their upper ends are secured to and wound around the winding-shaft. Thus it can be readily seen that when the winding shaft F is rotated in one direction the connections $f$ will be wound thereon, the electrode-supporting frame will be raised, and the plates lifted out of the solution, and when the shaft is rotated in the opposite direction the electrodes will be lowered into the solution in the cells and the electrode-supporting frame will rest upon the brackets $f^6$, which limit its downward movement.

A reservoir, G, is supported at the upper part of the main supporting-frame A, and is provided with a horizontal conduit, $g$, opening into the lower part of said reservoir and extending through the upper part of the main frame directly above the open ends of the cells, and said conduit is provided on its lower side over each cell with a dropping tube or nozzle, $g'$. The reservoir G is intended to be filled with some strong acid or alkali, (the nature of which depends upon the electrode being used,) which passes through the conduit and drops slowly and regularly from the depending nozzles or tubes into the cells, which are thus kept at a uniform strength, and the weakening of the solution or electrolyte is counteracted by the supply from said reservoir and tubes.

At a short distance from one end of the main frame a vertical partition, $e$, divides a small vertical space or chamber, M, from the main portion of the frame, in which are located the cells.

A shaft, H, is journaled at one end in the partition $e$, and its other end journaled in the opposite side of the main frame, said shaft being horizontally and centrally located directly over the cells and above the winding-shaft F and secured to said shaft H, and extending downwardly from the same into the solution in the cells are the bifurcated stirring-arms or agitators $h$, the arms of each bifurcated agitator passing downward from the rocking shaft upon opposite sides of the winding-shaft and diverging in opposite directions, by which the exciting-fluid is kept in constant commotion, thus destroying the gaseous bubbles forming on the plates.

A windlass-shaft, $i$, carrying a reel or drum, $i'$, is horizontally journaled in the lower part of the chamber or space in one end of the main frame, one end of said shaft passing through the outer wall or end of the main frame and being provided with a crank, $i^3$, whereby the said shaft $i$ can be rotated. Secured to and wound around the reel $i'$ is a rope or cord, $h'$, the free end of which is passed upwardly through the main frame over the pulleys $h^2$ and $h^3$, and then downward, and to the lower end of which is secured the operating-weight $h^4$. A gear-wheel, $i^2$, is loosely mounted upon the shaft $i$ at one end of the reel $i'$ within the space M, and said gear-wheel is held to rotate with the shaft $i$ in one direction by means of a ratchet-wheel, $i^4$, secured on said shaft, and a pawl, $i^5$, pivoted to the gear-wheel to run over the teeth when the shaft is turned to wind up the rope on the same and lock the gear-wheel to rotate with the shaft when said shaft is turned in the opposite direction.

A shaft, $g^2$, is journaled in the space M parallel with and above and to one side of the windlass-shaft $i$, and shaft $g^2$ is provided with a pinion, $g^4$, meshing with gear-wheel $i^2$ upon the windlass-shaft and near its opposite end with a gear-wheel, $g^3$, adapted to mesh with a pinion, $b'$, secured near one end of a horizontally-movable shaft, $b$. The horizontally-movable shaft $b$ is provided near its opposite end with a gear-wheel, $b^2$, and with another gear-wheel, $b^3$, adapted to mesh with a pinion, $f^2$, secured to the crank-shaft $f'$. The crank-shaft $f'$ is provided with a crank, $f^3$. The inner end of the rocking shaft H passes through the partition $e$, and is provided on its end within the space M, with a crank, $h^5$, which is pivotally connected with the crank on the crank-shaft $f'$ by means of a link, $f^4$. Thus it will be readily seen that when the crank-shaft is rotated through the medium of the train of gearing the link $f^4$ and crank $h^5$ will be given a reciprocating motion, and hence the shaft H will be given a rocking motion to and fro, which will vibrate the agitators back and forth within the solution in the cells.

A lever, $n$, is pivoted at one end to a bracket, $m$, and is secured to the horizontally-movable shaft $b$ between its ends, and to the lower or free end of said horizontally-movable shaft is secured a rope or cord, $m^2$, which passes through the side of the main frame, under pulley $n'$, thence upwardly and over pulley $m^3$, and thence downwardly, where it is secured to one end of a coiled spring, $m^4$, the other end of the coil-spring being secured to the operating-weight $h^4$.

The horizontally-movable shaft $b$ is yieldingly held in position with gear-wheel $b^3$, engaging pinion $f^2$ by means of a coil-spring, $m'$, interposed between lever $n$ and the side of the main frame, and it will be readily seen that when pressure is exerted upon the cord $m^2$ and it is pulled taut the free end of lever $n$ will be pulled outwardly, and with it shaft $b$, against the tension of spring $m'$ until gear-wheel $b^3$ is out of engagement with pinion $f^2$ and the movement of the agitators $h$ stopped, and gear-wheel $b^2$ is thrown into engagement with a pinion, $d$, secured to the portion of the winding-shaft F which passes through space M, and the winding-shaft will be rotated and the electrodes lifted from the cells.

Having fully set forth the construction of my device, I will now describe its operation:

Suppose the apparatus to be in the position shown in Fig. 1, the weight having been wound up to actuate the agitators and allow electricity to be generated for, say, five hours, it will be clearly understood that the pull of the weight will actuate the train of gears and rock-shaft H, which will vibrate the agitators $h$ within the solution in the cells, and by keeping the exciting fluid in a constant state of agitation will prevent the bubbles of gas from collecting on the plates, keeping the solution from having free access to the same. When the time for which the battery was set to run has nearly expired, the operating-weight $h^4$ will have reached such a point that the cord $m^2$ will be stretched taut and the train of wheels thrown out of gear with the agitator or rocking shaft and in gear with the winding-shaft, and, as the elasticity of the coil-spring $m^4$ will allow the weight $h^4$ to descend a small distance, the multiplying-gear will be actuated a sufficient amount to operate the winding-shaft and lift the plates or electrodes from the solution, and thus stop the operation of the battery.

It is evident that any other power can be used to actuate the device than that shown, and that any other train or system of gearing might be used, as experience may dictate. It is also evident that numerous slight changes might be resorted to in the form and arrangement of the parts described without departing from the spirit and scope of my invention; hence I do not wish to limit myself to the construction herein set forth, but consider myself entitled to all such slight changes.

The process or method of preventing polarization, &c., herein described, is not claimed in the present application, but forms the basis of a separate application filed February 20, 1888, Serial No. 264,550.

Having thus fully described my invention, what I claim, and desire to secure by Letters Patent of the United States, is—

1. The herein-described means for preventing polarization in galvanic generators, which consists in one or more agitators extending into the electrolyte, a train of gears connected with said agitators, and a source of power, whereby said agitators are actuated through the medium of said gears, substantially as described.

2. In a galvanic generator, one or more agitators extending into the solution or electrolyte, a rocking shaft, a train of gears, and a suitable source of power connected with said gears, whereby the agitator or agitators are actuated by the power through the medium of the gears and rocking shaft, substantially as described.

3. In a galvanic generator, a suitable frame, one or more cells containing a suitable electrolyte, a rocking shaft journaled in said frame, and one or more agitators secured to the said shaft and extending into said electrolyte, in combination with a train of gearing connected with the rocking shaft, and a weight to actuate said gearing, substantially as described.

4. In a galvanic generator, the combination of one or more cells containing suitable electrolyte, electrodes removably located in the electrolyte, a winding-shaft connected with the electrodes, a train of gearing, a source of power to actuate the gearing, and a laterally-movable gear-wheel, whereby the gearing is connected and disconnected with the winding-shaft, substantially as described.

5. In a galvanic generator, the combination of one or more bifurcated agitators extending into the electrolyte, a shaft carrying the bifurcated agitators, a train of gearing connected with the shaft, and a source of power to actuate said gearing and agitators, substantially as described.

6. In a galvanic generator, the combination of the electrolyte, plates or electrodes extending into the same, a winding-shaft, agitators extending into said electrolyte, a train of gearing normally connected with said agitators, a source of power, and a laterally-moving gear-wheel, whereby the power is connected with the raising-shaft to lift the electrodes from the electrolyte, substantially as described.

7. In a galvanic generator, the electrolyte, plates or electrodes, a raising device, and agitators extending into said electrolyte, in combination with a train of gearing normally connected with the agitators, a source of power to operate said gearing, and a laterally-moving gear-wheel, whereby said gearing is disconnected with the agitators and connected to raise the electrodes from the electrolyte, substantially as described.

8. In a galvanic generator, the combination of the electrolyte, the electrodes, a raising or winding shaft, agitators extending into the electrolyte, a weight, a train of gearing actuated by the weight, said gearing normally actuating the agitators, and a movable shaft connected with the weight, whereby, when said weight reaches a certain point, the gearing is disconnected with the agitators and thrown into gear with the winding-shaft, for the purpose described.

9. In a galvanic generator, the combination of the electrolyte, the electrodes secured to a suitable frame, a winding or raising shaft, one or more agitators secured to the same and extending into the electrolyte, a train of gearing normally actuating the agitators, a weight to actuate the gearing, and a longitudinally-movable shaft connected with the weight, whereby the agitators are thrown out of gear with the driving-power, and the electrodes are raised from the electrolyte when it is desired that the generation be discontinued, substantially as described.

10. The combination, with a rocking shaft and a winding-shaft, of a drum, a rope, cord, or wire wound thereon, and provided with a driving-weight at its opposite end, a longitudinally-movable shaft, gearing connecting the shaft and the drum, gearing connecting the movable shaft and rocking shaft, a spring to hold the movable shaft in gear with the rocking shaft, and a lever secured to the movable shaft and connected with the driving-weight, whereby the movable shaft is thrown out of gear with the rocking shaft and in gear with the winding-shaft, substantially as described.

11. In a galvanic generator, the combination of the electrolyte, a rocking shaft, one or more agitators secured to the rocking shaft and extending into the electrolyte, a crank upon one end of the rocking shaft, a crank-shaft connected with the crank upon the end of the rocking shaft, a train of gearing to drive said crank-shaft, and a weight to drive the train of gearing, substantially as described.

12. The combination, with the winding-shaft and rocking shaft, of cranks to drive the rocking shaft, a longitudinally-movable shaft normally driving the crank-shaft and provided with gearing to drive the winding-shaft, gearing and a weight to drive the movable shaft, a lever to throw the movable shaft out of gear with the crank-shaft and in gear with the winding-shaft, and a cord and spring, whereby said lever is connected with the weight, substantially as described.

13. In a galvanic generator, the combination, with the electrolyte, of one or more agitators extending into the same, and a suitable source of power connected with the agitators, whereby the same are given a to-and-fro motion within the electrolyte, for the purpose described.

14. In a galvanic generator, the combination, with the electrolyte and electrodes removably located in the same, of gearing, a suitable source of power to actuate said gearing, and a laterally-movable gear-wheel, whereby said gearing is connected to raise the electrodes from the electrolyte, substantially as described.

15. In a galvanic generator, the combination, with the electrolyte, the electrodes removably located in the same, and agitators extending into the electrolyte, of gearing normally actuating the agitators, a source of power to drive the gearing, and a laterally-moving gear-wheel, whereby said gearing is disconnected with the agitators and connected with the electrodes to raise the same from the electrolyte, substantially as described.

In testimony that I claim the foregoing as my own I affixed my signature in presence of two witnesses.

HARRY BARRINGER COX.

Witnesses:
CHAS. M. WERLÉ,
HUBERT E. PECK.